May 10, 1949.　　　　G. G. ELLNER　　　　2,469,872
RAY-EMISSION APPARATUS
Filed Nov. 30, 1944　　　　3 Sheets-Sheet 1
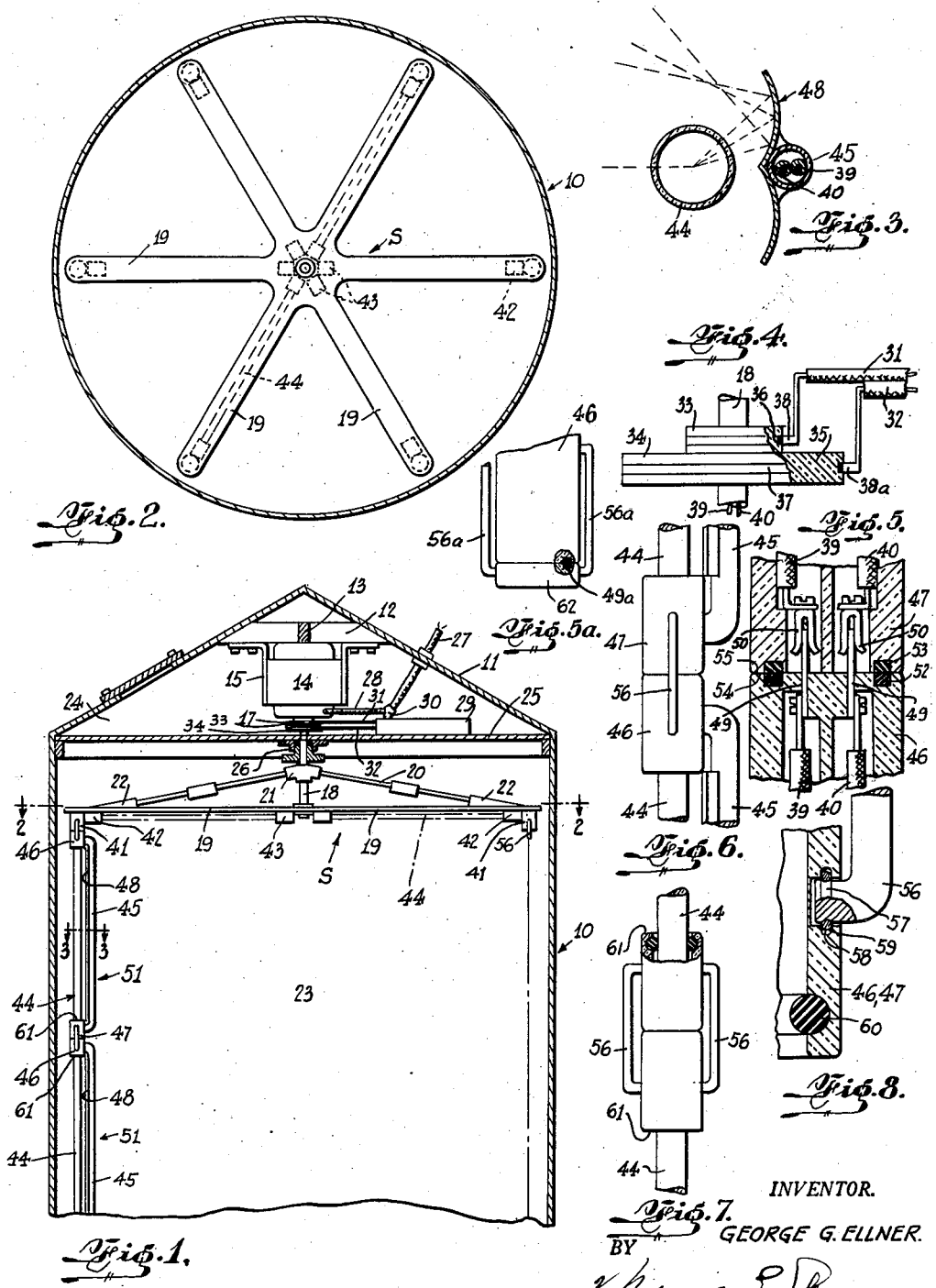
INVENTOR.
GEORGE G. ELLNER.
BY
ATTORNEY.

May 10, 1949.   G. G. ELLNER   2,469,872
RAY-EMISSION APPARATUS
Filed Nov. 30, 1944   3 Sheets-Sheet 2
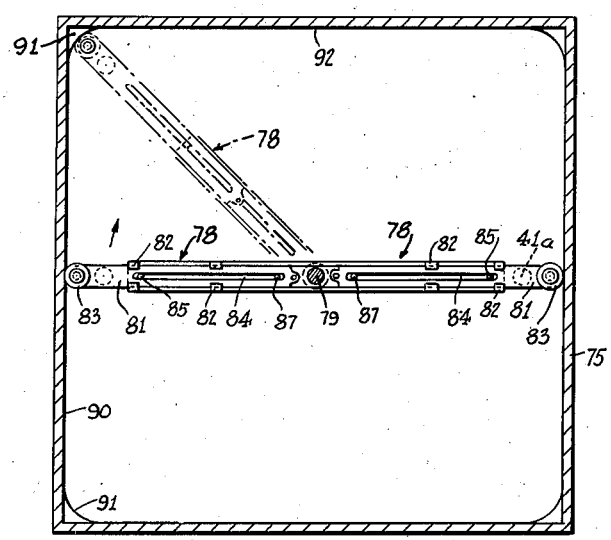
Fig. 10.
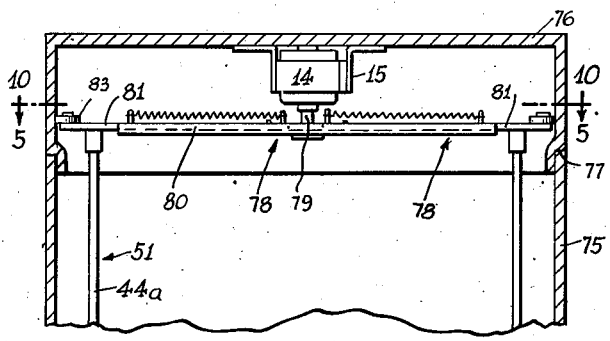
Fig. 9.
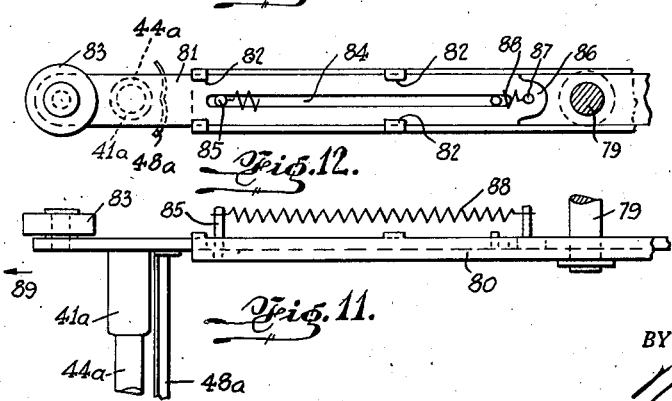
INVENTOR.
GEORGE G. ELLNER.
BY
ATTORNEY.

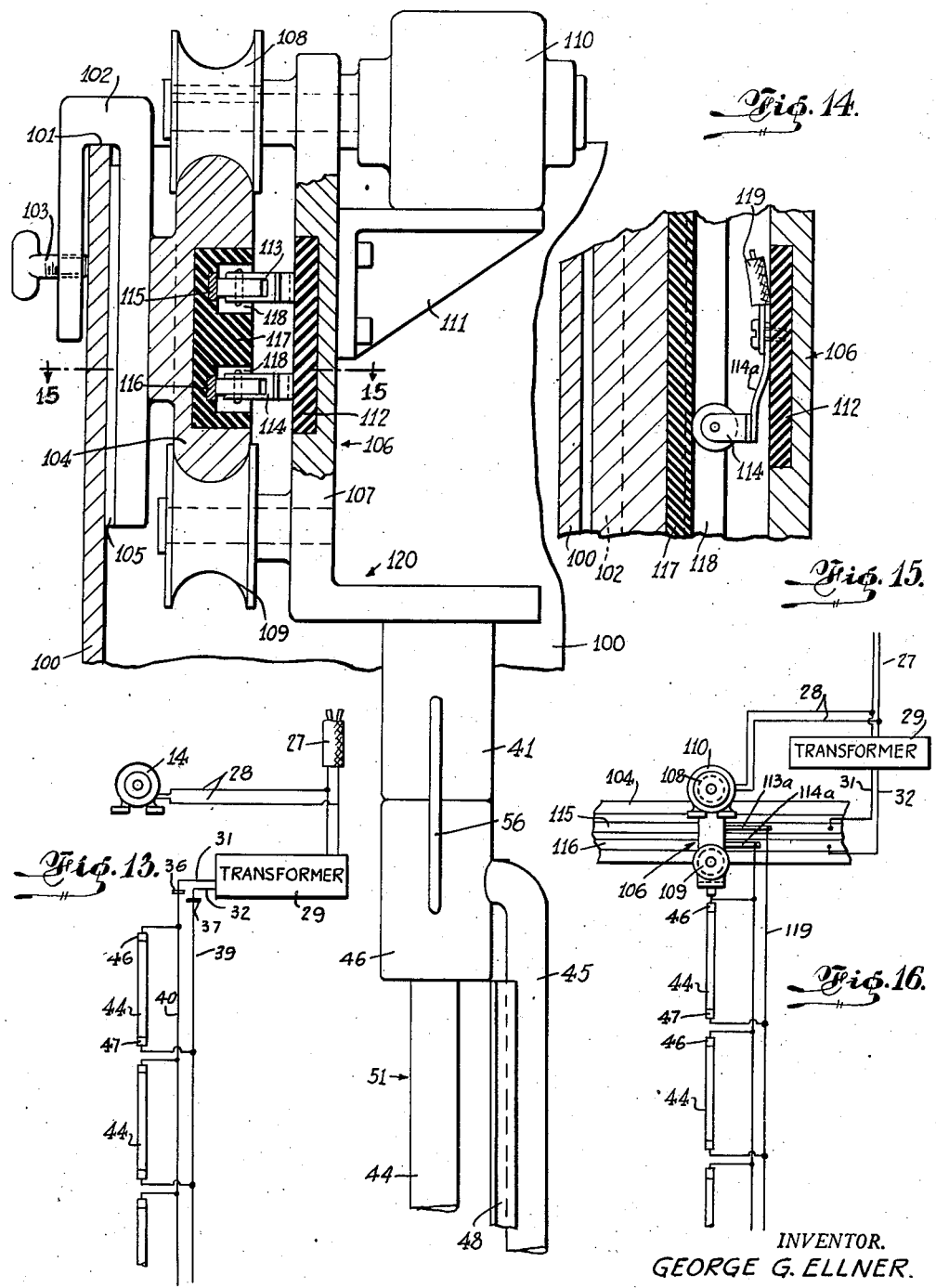

Patented May 10, 1949

2,469,872

UNITED STATES PATENT OFFICE 2,469,872

RAY-EMISSION APPARATUS

George G. Ellner, Long Island, N. Y.

Application November 30, 1944, Serial No. 565,967

1 Claim. (Cl. 250—52)

This invention relates to the application of ray-emission means for treating or sterilizing surfaces and contents of receptacles, containers, tanks, etc., for destroying or appreciably reducing the number of bacteria, yeasts, molds, algae, virus and other micro-organisms or other undesirable germs, and for other germicidal or sterilizing purposes, and to possibly replace pasteurization, heat or chemical sterilization, or fumigation.

It is an object of the present invention to efficiently utilize in a practical and economical and safe manner ray-emission means for maintaining in good normal condition, sterilizing or otherwise treating surfaces of enclosed or exposed areas; fluids or other substances within a vessel or the environment therewithin.

It is a further object of the present invention to utilize ray-emission means in an effective manner for preventing the fermentation, molding, bacterial, algaeic or other spoilage or changes in and maintaining intact in good condition for appreciable periods, fluids or other substances, which are stored or contained in a receptacle.

Yet a further object of the present invention is to increase the vitamin D content in certain fluids and other substances by suitable and effective application of ray-emission means, in a safe, economical and non-hazardous manner, while such fluid or substance is in the process of being stored or contained within a tank or other receptacle, and in improved means for supporting and making liquid proof the ray-emission means.

A still further object of the present invention is to provide novel ray-emission means and instrumentalities for installing the same either temporarily or permanently in tanks, compartments, or other containers or receptacles, in such manner as to provide a sterile environment surrounding the substance to be treated as well as to irradiate the substance itself.

Other objects of the invention are to provide novel rotatable or movable ray-emission apparatus in a tank or other receptacle which effectively and efficiently provides germicidal energy to reduce or eliminate the bacterial content within the tank and the substance therewithin; kill air-borne bacteria, etc., within the tank or other vessel, and generally maintain the sterility of the contents of the tank, or at least prolong the period during which the contents of the tank may be maintained in good condition without spoilage by bacteria, mold or other micro-organisms.

The above and other objects and advantages of the invention will appear as the description proceeds. To enable others skilled in the art so fully to comprehend the underlying features thereof that they may embody the same by the numerous modifications in structure and relation contemplated by this invention, drawings depicting certain forms of the invention have been annexed as a part of this disclosure, and in such drawings, like characters of reference denote corresponding parts throughout all of the views, of which:

Fig. 1 is a longitudinal sectional view taken through the upper portion of a cylindrical storage tank embodying the invention;

Fig. 2 is a sectional view taken along line 2—2 of Fig. 1;

Fig. 3 is an enlarged sectional view taken on line 3—3 of Fig. 1;

Fig. 4 is an enlarged detail view of the electrical connecting means supplying the power to the ray-emission tubes;

Fig. 5 is an enlarged detail view in section of the electrical connection between the tube sockets;

Fig. 5a is an outside view of a seal cover for covering the socket not employed;

Fig. 6 is an enlarged detail view of the tube socket connection;

Fig. 7 is a left hand side view of Fig. 6;

Fig. 8 is an enlarged detail view in section of clamping means employed in the invention;

Fig. 9 is a longitudinal sectional view of the upper portion of a rectangular storage tank embodying the invention in a modified form;

Fig. 10 is a sectional view taken on line 10—10 of Fig. 9;

Fig. 11 is an enlarged front elevational detail view of the lamp carrier arm;

Fig. 12 is a plan view of Fig. 11;

Fig. 13 is an electrical wiring diagram showing power supply;

Fig. 14 is a cross-sectional view taken through the upper portion of an open tank showing the track means for movably supporting ray-emission lamps, this being a further form of the invention;

Fig. 15 is a sectional view taken on line 15—15 of Fig. 14; and

Fig. 16 is a wiring diagram for Fig. 13.

Referring now more particularly to Figs. 1-8, inclusive, of the drawings, there is disclosed a cylindrically-shaped receptacle 10 adapted to contain any substance to be sterilized or otherwise treated by application of suitable rays, such as, for example, ultra-violet or other effective rays to eliminate or prevent the growth of bacteria, mold, virus, or other undesirable germs; or it may be desired to treat the receptacle for such one or more purposes.

Receptacle 10 is indicated as having a gabled top or cover 11 from which the following described rotatable ray-emission means is supported and suspended, but it is to be understood that the said means may be applied to the receptacle in any suitable manner and by any suitable means.

Secured to top or cover 11 are the cross beams 12, 13. Driving means, such as motor 14, is secured to beams 12, 13 by any suitable means, such as, for example, the straps and brackets 15. Projecting from motor bearing 17 is a rotatable shaft 18 to which is fixed a plurality of arms 19. Arms 19 are braced by means of conventional adjustable straps or turn buckles 20, the latter being secured to shaft 18 by collar 21 and to arms 19 by the members 22.

Storage tank 10 is divided into the storage compartment 23 for holding the liquid to be irradiated, and the upper compartment 24. Both compartments are sealed from each other by means of a partition 25. Passage of shaft 18 through partition 25 is sealed by means of a conventional stuffing box 26. Electric current is supplied through cable 27 branching off into the supply line 28 to motor 14, and to transformer 29 at 30. High tension wiring 31, 32, from transformer 29 leads to contact disks 33, 34. Disks 33, 34 are mounted on shaft 18 (see Fig. 4) and are made of electrical insulating material 35. Metal bands 36, 37 in disks 33, 34 are contacted by brushes 38, 38a connected to high tension wires 31, 32 coming from transformer 29.

Wires 39, 40, connect with contact rings 36, 37, respectively, and pass through hollow tubes 20 and connect with sockets 41, 42, 43, as shown in Fig. 1, and diagrammatically in Fig. 13.

If it is desired to use the ray-emission lamps in vertical position, the lamps or tubes 44 may be disposed in tandem as shown in Fig. 1. Each sterile lamp 44 is secured between a frame consisting of electric conduit 45, top socket 46, bottom socket 47 and the reflector 48. Top socket 46 of each lamp is provided with conventional male connections 49, while the lower socket 47 is provided with the convention female connections 50. When the tubes or lamps 44 are arranged in tandem, the lower socket 47 of one lamp carrier 51 engages the upper socket 46 of the adjacent lamp carrier 51 through the connections 49, 50. Resilient seals 52, 53 are provided on the surfaces 54, 55 of sockets 46, 47, respectively, forming a water-tight seal when these sockets are connected together, the same being held in connected position by retainer brackets 56 having grooves 57 at each end which engage clamping springs 58 located in groove 59 of each socket 46, 47. Resilient washers 60 are provided at the end of each socket adjacent the ray-emission lamp, thus sealing the other ends 61 of sockets 46, 47. After said lamp and carriers have been arranged in tandem within the tank to provide maximum radiation, it is essential to close the female socket end 50 on lowermost carrier 51 to prevent short circuiting, for which purpose a cap 62 is provided having brackets 56a and a resilient washer 49a, the brackets 56a fitting cap 62 and the socket similar to the fit made by bracket 56.

At times it may be desirable to dispose the ray-emission lamps in horizontal position instead of having them suspended in vertical position, when, for example, it is desired to irradiate the surface only of a liquid contained in tank 10. For this purpose, all of the carriers 51 are dismantled by disconnecting brackets 56 and separating the carriers. Closure caps 62 are then applied to sockets 41 carried by arms 19 to seal the sockets. Ray-emitting lamps 44 are then applied in conventional manner between sockets 42, 43 carried by arms 19.

It is understood that in lieu of sockets 42, 43, sockets similar to those indicated by the numerals 46, 47 may be secured to the arms 19 in such manner, so that the complete carriers 51 may be separated from each other and be deployed in horizontal positions on the arms 19.

It is further understood that as many such carriers 51 may be employed on the arms 19 as may be found necessary, depending upon the size of the tank employed and the potency of the individual ray-emission tubes.

It is further understood that in lieu of providing high tension voltage at the rings 33, 34 and at the socket connections of carriers 51, the carriers 51 may be provided with individual transformers thereby only requiring the passage of low-voltage current at the rings 33, 34, or at the sockets of carriers 51.

It is again understood that in lieu of straight tubes 44, the carriers 51 may be equipped with U-shaped tubes as disclosed in my copending applications; or any other shaped tubes.

In Figs. 1 and 2, since the tank 10 is cylindrical the radial arms 19 are permanently arranged on spider S equidistant from shaft 18. According to the embodiment illustrated in Figs. 9-12, inclusive where the ray-emission means are applied in a rectangular or oval tank, it is desirable to provide extendable arms for carrying the ray-emission lamp to effect irradiation of the side walls of the tank and the contents therein. Considering a tank 75 of rectangular shape, this tank may be provided with a removable cover 76 seated at 77, cover 76 having secured thereto by means of straps 15 a motor 14. Arms 78 are secured to motor 14 by means of shaft 79. Each arm 78 comprises a channeled portion 80 and an extension 81 which slidably engages therewith. Prongs 82 guide sliding arm extensions 81. The outermost end of each extension 81 is provided with a roller 83 and carries an electrical socket 41a to which is secured a lamp 44a preferably in a manner similar to that described with reference to the sockets in Figs. 5-8, inclusive. It is evident that the carrier units 51 which include the ray-emission lamps may be arranged in tandem. Each extension 81 has a longitudinal slot 84 to accommodate a pin 85 which is secured to channelled portion 80. At the inner end 86 of extension 81 is a pin 87. Pins 85 and 87 support a coiled spring 88 which urges sliding extension 81 outwardly as indicated by the arrow 89 (Fig. 11); thus causing arm extension 81 to be maintained in constant contact with inner surfaces or walls 90 of tank 75. The corners of tank 75 are provided with curved face portions as indicated at 91 to permit rollers 83 to ride thereover and not interfere with their smooth travel over the inside surfaces 90 of tank 75. Thus, it is obvious that as the arms 78 rotate about shaft 79, they will project and retract and extend into corners 91, by means of the action of springs 88 upon slidable extensions 81. Full retraction of extensions 81 will take place at the point 92 on each wall 90 of the receptacle 75, thus maintaining lamps 44a at all times substantially a constant distance from the inner walls of the receptacle.

Figs. 14 and 15 illustrate the invention in a further modified form. An open tank which may be round, oval, rectangular, etc., has attached thereto a track device on which one or more ray-emission units may travel. In this instance, on the upper edge 101 of tank 100 rests a U-shaped support 102 having clamping means 103 on the outside thereof for securing the support to the tank, and a rail portion 104 on the inside thereof. If desired a sound-reducing cushion 105 may be applied between support 102 and the inside wall of tank 100. Track 104 is continuous and where applied to a rectangular tank is sufficiently rounded at the corners to permit the easy and uninterrupted travel of the carriage 106 along the track. Carriage 106 consists of frame 107 having mounted thereon two rollers 108, 109 in engagement with track or rail 104. Roller 108 is driven by a speed reduction motor 110 supported on frame 107 by a bracket 111. Frame 107 has an insulating member 112 to which are attached rollers 113, 114 forming electric contacts respectively with electric rails 115, 116. Rails 115, 116, are located in recesses 118 of an insulating strip 117 embedded in track 104. Current conducting wires 119 secured to rollers 113, 114 connect with the ray-emission lamp units 51, as shown diagrammatically in Fig. 16. According to Fig. 16, the wires 31, 32 from the high voltage side of the transformer 29 are connected to rails 115, 116, and the wires 119 which feed the sockets for the ray-emission tubes 44 are connected to rollers 113, 114 through terminals 113a, 114a.

As may be readily seen from Fig. 14 one or more ray-emission units 120 may be arranged to travel over the demountable rail 104. Motor 110 will slowly rotate wheel 108 causing the ray-emission means carrying unit 120 to move in a desired direction, and slowly irradiating by means of the ray-emission units 51, the inside surfaces or walls of the tank 100, or the contents therein.

If desired, the transformer 29 may be mounted on the carriage 106, the necessary electrical connections being correspondingly changed. In this way only relatively low voltage current would be fed to the rollers 113, 114.

Although the drawings, and the above specification disclose the best modes in which I have contemplated embodying my invention, I desire in no way to be limited to the details of such disclosure, for in the further practical application of my invention many changes in the forms and proportions may be made as circumstances require or experience suggests without departing from the spirit of the invention within the scope of the appended claim.

Having thus described my invention what I claim as new and desire to secure by Letters Patent, is:

In ray-emission apparatus, in combination, a motor, a vertical shaft, means including said motor for rotating said shaft, a plurality of arms extending from said shaft in a generally horizontal direction, a socket on each of said arms mounted adjacent the end thereof remote from said shaft, a plurality of bactericidal ray-emitting lamps each adapted to be secured in a respective one of said sockets for rotation around said shaft, circuit means for energizing said lamps through said respective sockets, said sockets being arranged to support said lamps in substantially vertical position, auxiliary socket means and additional bactericidal ray-emitting lamps connectable by said auxiliary socket means in tandem with respective ones of the first-mentioned lamps, clamping means engaging said auxiliary socket means to hold each pair of tandem-connected lamps in fixed relative position, said sockets being arranged to support said lamps in substantially vertical position, and a plurality of second and third sockets mounted adjacent the first-mentioned sockets and adjacent said shaft, respectively, for supporting said lamps in substantially horizontal position alongside respective ones of said arms.

GEORGE G. ELLNER.

REFERENCES CITED

The following references are of record in the file of this patent:

UNITED STATES PATENTS

| Number | Name | Date |
| --- | --- | --- |
| 1,297,525 | Wood | Mar. 18, 1919 |
| 2,096,746 | James | Oct. 26, 1937 |